United States Patent [19]

Boegner et al.

[11] Patent Number: 6,082,100
[45] Date of Patent: Jul. 4, 2000

[54] METHOD FOR OPERATING A MULTICYLINDER INTERNAL COMBUSTION ENGINE

[75] Inventors: Walter Boegner, Remseck; Frank Duvinage, Kirchheim; Walter Friess, Stuttgart; Karl-Ernst Haak, Lichtenwald; Bernd Krutzsch, Denkendorf; Rudolf Maly, Sindelfingen; Viktor Pfeffer, Ostfildern; Stefan Pischinger, Aachen; Gregor Renner, Stuttgart; Dirk Voigtlaender, Krontal-Muenchingen; Michel Weibel; Guenter Wenninger, both of Stuttgart; Friedrich Wirbeleit, Esslingen, all of Germany

[73] Assignee: DaimlerChrysler AG, Stuttgart, Germany

[21] Appl. No.: 09/181,645

[22] Filed: Oct. 29, 1998

[30] Foreign Application Priority Data

Oct. 29, 1997 [DE] Germany .................. 197 47 671

[51] Int. Cl.[7] .................................................. F02M 25/06
[52] U.S. Cl. ................. 60/278; 60/274; 60/286; 60/295; 60/297; 123/443; 123/568.18; 123/698
[58] Field of Search ................. 60/278, 279, 295, 60/297, 301, 286, 285, 303, 274; 123/443, 698, 568.18, 406.47, 406.48

[56] References Cited

U.S. PATENT DOCUMENTS

| 4,215,540 | 8/1980 | Kobayashi et al. | 60/278 |
| 4,231,338 | 11/1980 | Sugasawa et al. | 123/568 |
| 5,758,493 | 6/1998 | Asik et al. | 60/274 |
| 5,894,726 | 4/1999 | Monnier | 60/274 |
| 5,946,906 | 9/1999 | Akazaki et al. | 60/278 |
| 5,987,884 | 11/1999 | Kibe et al. | 60/286 |

FOREIGN PATENT DOCUMENTS

| 43 19 294 C1 | 5/1994 | Germany . |
| 195 17 168 A1 | 11/1995 | Germany . |
| 195 22 165 A1 | 12/1995 | Germany . |

*Primary Examiner*—Thomas Denion
*Assistant Examiner*—Binh Tran
*Attorney, Agent, or Firm*—Evenson, McKeown, Edwards & Lenahan, P.L.L.C.

[57] ABSTRACT

A method for operating a multicylinder internal combustion engine with at least one adsorber catalytic converter in the exhaust line of the internal combustion engine includes operating the adsorber catalytic converter with periodically alternating adsorption and desorption operation. The exhaust leaving the adsorber catalytic converter in desorption operation is recycled and/or an oxidation catalytic converter is provided upstream of the adsorber catalytic converter. Exhaust recycling takes place occurs selectively in only one set of the cylinders of the internal combustion engine and this set of cylinders is operated in a state of incomplete combustion during desorption operation. Rich afterburning may be performed during desorption operation of the adsorber catalytic converter in the oxidation catalytic converter connected upstream and the oxidation catalytic converter is operated at an increased temperature during short regeneration phases to remove soot.

6 Claims, 1 Drawing Sheet

METHOD FOR OPERATING A MULTICYLINDER INTERNAL COMBUSTION ENGINE

BACKGROUND AND SUMMARY OF THE INVENTION

This application claims the priority of German Patent Application No. 197 47 671.6, filed Oct. 29, 1997, the disclosure of which is expressly incorporated by reference herein.

The present invention relates to a method for operating a multicylinder internal combustion engine, such as a motor vehicle engine with at least one adsorber catalytic converter in the exhaust line of the internal combustion engine. The adsorber catalytic converter is operated with periodically alternating adsorption and desorption steps. In particular, the invention relates to methods in which (1) the exhaust gas leaving the adsorber catalytic converter in desorption operation is recycled to the intake side of the internal combustion engine and/or (2) the exhaust is passed through an oxidation catalytic converter connected upstream before it enters the adsorber catalytic converter.

German Patent document DE 195 17 168 A1 discloses an $NO_x$ adsorber catalytic converter that operates alternately in adsorption and desorption operation. In desorption operation of the $NO_x$ adsorber catalytic converter, incomplete combustion is produced in the internal combustion engine. For this purpose, exhaust recycling to the intake manifold of the internal combustion engine is provided, thereby reducing the combustion temperature in the engine and/or the likelihood of increasing misfirings in the engine. By such exhaust recycling (or possibly through other measures, particularly retarding the ignition point, thus making the air/fuel mixture in the engine leaner, or intermittently inhibiting ignition in all or individual cylinders), the combustion in an internal combustion engine operating with spark ignition is made worse, so that incompletely burned fuel components enter the exhaust from the internal combustion engine and make possible sufficient desorption and reduction of the stored nitrogen oxides in the $NO_x$ adsorber catalytic converter during desorption operation.

German Patent document DE 195 22 165 A1 discloses a method for operating an internal combustion engine with a $NO_x$ adsorber catalytic converter in which temporary heating of the $NO_x$ adsorber catalytic converter above normal operating temperature is provided to remove impurities. For this purpose, it is proposed that the exhaust temperature be raised by measures inside the engine. In particular, fuel is afterburned in the exhaust line as both unburned fuel and excess air are fed into the exhaust from the internal combustion engine. This is achieved by incomplete combustion in one set of the engine cylinders and by combustion with excess air in another set of the engine cylinders. Moreover, retarding the ignition point and simultaneously increasing the quantity of intake air are proposed, which also leads to an increase in the exhaust temperature due to afterburning in the exhaust line. Richer operation of the engine with simultaneous addition of secondary air to the $NO_x$ adsorber catalytic converter is also proposed, with the same effect.

German Patent document DE 43 19 294 C1 discloses a method for reducing nitrogen oxides in the exhaust of an engine in which a $NO_x$ adsorber catalytic converter is operated with periodically alternating adsorption and desorption operation and the exhaust leaving the adsorber catalytic converter operating in desorption operation is recycled to the intake air of the engine. In particular, two catalytic converters in parallel can be used, operated alternately in adsorption and in desorption operation. The nitrogen oxides contained in the recycled exhaust are reacted in the engine, which can therefore be operated continuously with complete combustion.

The object of the present invention is to create a method for operating a multicylinder internal combustion engine with at least one adsorber catalytic converter, which ensures improved exhaust scrubbing by the simplest possible means with minimal impairment of engine operation.

In an embodiment of the present invention, exhaust recycling takes place in only one set of the cylinders of the internal combustion engine, which is operated during each catalytic converter desorption phase in a state of incomplete combustion. In this set of cylinders, the atmosphere is favorable for reacting desorbed nitrogen oxides. At the same time, exhaust is produced, which in turn favors desorption of the nitrogen oxides and possibly other adsorbed substances in the adsorber catalytic converter. Such thermodynamically unfavorable conditions remain limited to this set of cylinders, while the remaining cylinders can be operated with complete combustion so that the engine as a whole can achieve relatively high efficiency.

In another embodiment of the present invention, an oxidation catalytic converter connected upstream of the adsorber catalytic converter is used to process the exhaust fed to it. With the aid of rich afterburning in the oxidation catalytic converter, incompletely oxidized exhaust components are generated and favorable conditions are created for desorption in the adsorber catalytic converter. The oxidation catalytic converter is operated for short regeneration phases at an elevated temperature, where soot, particles, or hydrocarbons that formerly were precipitated onto the oxidation catalytic converter are removed. The oxidation catalyst can be regenerated either during the adsorption or the desorption operation of the adsorber catalytic converter connected downstream depending on which substances are released when the oxidation catalyst is regenerated.

In another embodiment of the present invention, the desorption process is favored in the adsorber catalytic converter by supplying exhaust low in nitrogen oxides, which comes from the set of the cylinders of the internal combustion engine involved in exhaust recycling, which is specifically adaptable to this process.

In another embodiment of the present invention, the exhaust from the cylinders to which recycled exhaust has not been fed (and possibly residual exhaust from the remaining cylinders, which are operated in a state of incomplete combustion) is fed to the adsorber catalytic converter that is adsorbing at the time, so that when it is released to the environment it is as clean as possible.

In another embodiment of the present invention, an exhaust temperature higher than that in normal operation is achieved by measures internal to the engine. The internal engine measures however usually have to be effected in only some of the cylinders. These engine control measures can be applied specifically for a short period of time, when limitation to one set of cylinders leads to less impairment of performance and engine efficiency. Moreover, the increase in exhaust temperature can be precisely adjusted and controlled.

Other objects, advantages and novel features of the present invention will become apparent from the following detailed description of the invention when considered in conjunction with the accompanying drawings.

DETAILED DESCRIPTION OF THE DRAWINGS

Figure 1:
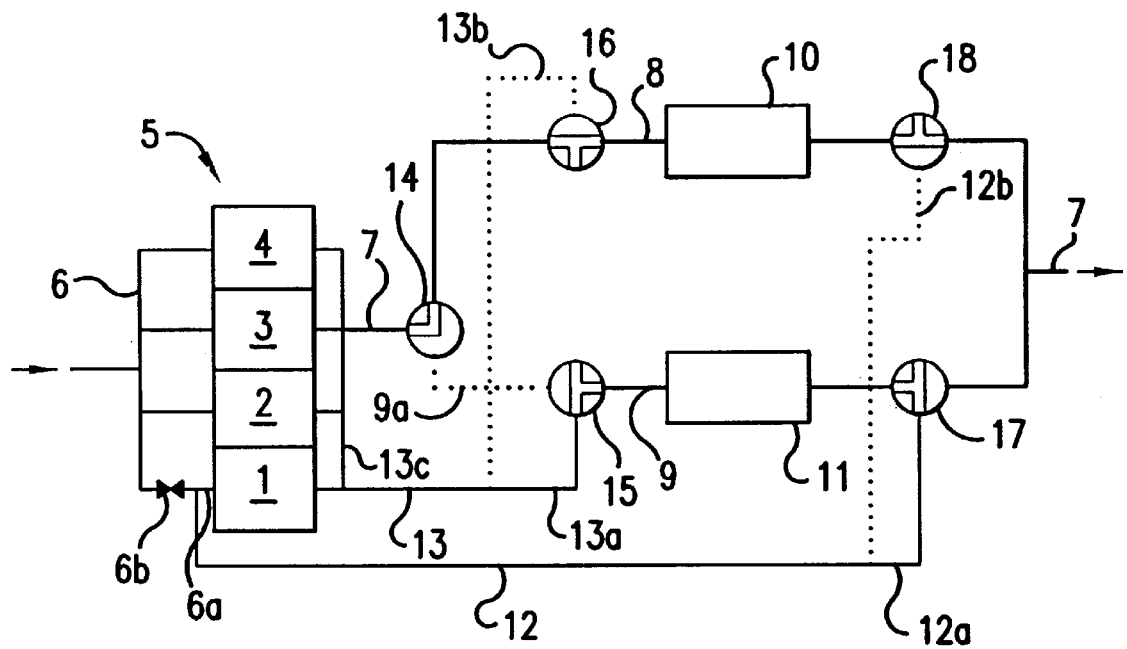
FIG. 1 is a block diagram of a multicylinder motor vehicle internal combustion engine with associated exhaust scrubbing system operable according to a first embodiment.

In FIG. 1, a motor vehicle internal combustion engine operable according to a first embodiment is shown in the form of a reciprocating engine 5, which has a total of four cylinders 1 to 4. An exhaust line is associated with reciprocating engine 5, said line comprising a main exhaust line 7 branching into a right and a left partial line 8, 9, a secondary exhaust line 13, two $NO_x$ adsorber catalytic converters 10, 11, and several switching valves 14 to 18. Reciprocating engine 5 receives its combustion air through intake manifold 6, which has an air intake duct 6a with a throttle valve 6b, and is especially associated with cylinder 1. Between throttle valve 6b and the air intake of cylinder 1, an exhaust recycling line 12 enters air intake duct 6a.

In normal operation of reciprocating engine 5, cylinders 1 to 4 expel exhaust containing pollutants such as CO, $NO_x$, or hydrocarbons, said exhaust being conducted through one of the conventionally constructed $NO_x$ adsorber catalytic converters 10, 11.

FIG. 1 shows $NO_x$ adsorber catalytic converter 10 in adsorption operation receiving the exhaust from reciprocating engine 5, which reaches adsorber catalytic converter 10 via the right-hand partial segment 8 of main exhaust line 7. Switching valves 14, 16, 18 are at this point in the positions shown in FIG. 1, so that the scrubbed exhaust coming from catalytic converter 10 can be fed via right-hand partial line 8 and main exhaust line 7 to additional exhaust scrubbing devices or discharged directly to the atmosphere.

Second $NO_x$ adsorber catalytic converter 11 is operated in desorption operation during the adsorption phase of adsorber catalytic converter 10 by a method according to the present invention. For this purpose, a portion of the combustion exhaust from cylinder 1 is fed via secondary exhaust line 13, a branch line 13a, and left partial segment 9 of the main exhaust line to adsorber catalytic converter 11, and cylinder 1 is operated in such a way that it generates exhaust that is low in nitrogen oxides and oxygen as well as partially oxidized components, and is particularly suited for the desorption process in adsorber catalytic converter 11. Switching valves 15 and 17 are set to their positions shown in FIG. 1, so that adsorber catalytic converter 11 receives only the exhaust from cylinder 1 and at the same time the exhaust leaving adsorber catalytic converter 11 is recycled via a branch line 12a and exhaust recycling line 12 is recycled to air intake duct 6a of cylinder 1. Also, the intake air of cylinder 1 is throttled by throttle valve 6b and the fuel feed to cylinder 1 is adjusted to the air composition in cylinder 1.

In addition, the combustion process in cylinder 1 of a reciprocating engine 5 operated by the Diesel principle is operated in such a way, particularly by optimal fuel injection, that nitrogen oxide emissions from combustion in cylinder 1 are minimized while avoiding increased soot formation. An appropriate injection strategy with pre-, main-, and after-injection should be chosen for this purpose, with the injection times being variably adjustable. Moreover, fuel can be injected during the intake stroke of the cylinder and/or cylinder 1 can be operated with an air/fuel ratio ($\lambda$) of $\lambda \leq 1$.

The proposed arrangement ensures that the exhaust to be fed to an additional exhaust treatment system or to the outside air is completely conducted through adsorber catalytic converter 10 operating in adsorption mode, whereby that portion of the exhaust from cylinder 1 that arrives at main exhaust line 7 through a branch line 13c is no greater than required for the conditions necessary for adsorption operation in adsorber catalytic converter 10 to be maintained. This is ensured in particular by the fact that cylinders 2, 3, 4 are operated by the Diesel principle with of course an air/fuel ratio that is considerably higher than one. The unchanged operation of cylinders 2, 3, 4 ensures that the performance and efficiency of the engine as a whole are minimally affected by the measures taken for desorption operation of adsorber catalytic converter 11.

To operate both $NO_x$ adsorber catalytic converters 10, 11 alternately in adsorption and desorption operation, the possibility exists, by appropriate switching of switching valves 14 to 18, of simultaneously switching adsorber catalytic converter 11 to adsorption operation and switching adsorber catalytic converter 10 to desorption operation. For this purpose, the main exhaust flow is fed via main exhaust line 7, a branch line 9a, and left partial segment 9, to adsorber catalytic converter 11, while adsorber catalytic converter 10 receives the exhaust from cylinder 1 via secondary exhaust line 13, a branch line 13b represented by a dotted line, and right-hand partial segment 8. In this case, the exhaust leaving adsorber catalytic converter 10 is completely recycled via exhaust recycling lines 12b and 12 to cylinder 1.

If reciprocating engine 5 is operated by the four-cycle principle, during the desorption phase of adsorber catalytic converter 11 an air/fuel ratio particularly favorable for reducing nitrogen oxides can be firmly established in cylinder 1, so that desorption in adsorber catalytic converter 11 can take place under approximately constant conditions, with an air/fuel ratio of $\lambda > 1$ in cylinders 2 to 4 being preferred.

This produces a sufficient residual oxygen level in the main exhaust flow, which is favorable to adsorption in adsorber catalytic converter 10.

In a modified embodiment, the exhaust is not recycled to air intake duct 6a of cylinder 1, but uniformly to all the cylinders via intake manifold 6. In this embodiment, there is thus a conversion of the desorbed nitrogen oxides in all the cylinders of the reciprocating engine regardless of the operating principle of the latter. Moreover, only a portion of the cylinders (e.g., cylinder 1) is operated in such fashion that optimal desorption in the desorbing adsorber catalytic converter 10 or 11 in question, is achieved.

Figure 2:
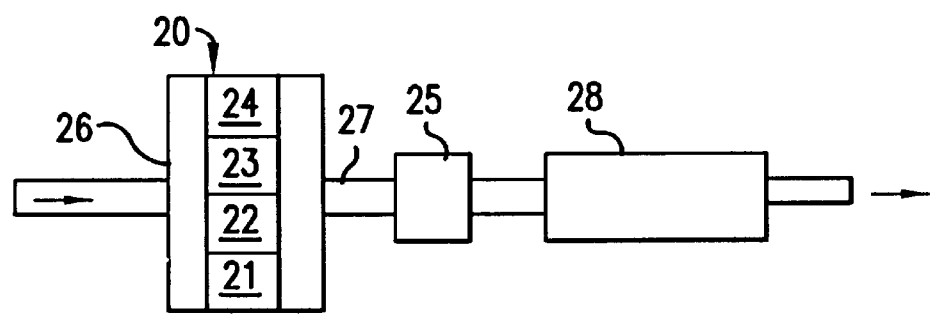
FIG. 2 is a block diagram of a multicylinder motor vehicle internal combustion engine with associated exhaust scrubbing system operable according to a second embodiment.

A second embodiment according to the present invention is intended for an internal combustion engine which is designed in the form of a reciprocating engine 20 according to FIG. 2 operating on the Diesel principle. Reciprocating engine 20 has four cylinders 21 to 24 which receive their combustion mixture via a so-called common rail injection system 26 and whose main exhaust line 27 contains an oxidation catalytic converter 25 and a $NO_x$ adsorber catalytic converter 28 for exhaust scrubbing.

The oxidation catalytic converter is positioned in known fashion as close as possible to the engine and, largely unselectively, oxidizes unburned and partially burned components of the exhaust. Adsorber catalytic converter 28 is operated conventionally, alternating between adsorption and desorption operation. During its desorption operation, a rich afterburning takes place in oxidation catalytic converter 25, whereby the exhaust from reciprocating engine 20 is aftertreated with a lean air/fuel ratio in such a way that a large quantity of partially oxidized components is created in the exhaust, so that an atmosphere suitable for the desorption of nitrogen oxides and the reduction of nitrogen oxides that proceeds in parallel is then provided in adsorber catalytic converter 28.

Provision is made for this purpose to inject additional fuel into some of cylinders 21 to 24 of reciprocating engine 20. This additional fuel can be injected during the intake stroke into the intake manifold of any cylinders, but increasing the regular quantity injected or late post-injection into the combustion chambers of the individual cylinders is possible. These measures ensure that a sufficient quantity of unburned or partially burned fuel components reaches the exhaust, so that the aforementioned rich afterburning can take place in oxidation catalytic converter 25. Because this type of combustion in Diesel engine 20 generally results in increased soot and particle emissions, deposits must be expected in oxidation catalytic converter 25. Since such deposits adversely affect the function of oxidation catalytic converter 25, short regeneration phases are provided for the oxidation catalyst, during which the deposits are removed. For this purpose, the exhaust is made to enter oxidation catalytic converter 25 whose temperature is increased to 500° C. to 800° C. Such regeneration phases last for approximately 0.5 sec to 10 sec for appropriate regeneration.

According to the present invention, an additional quantity of fuel is injected in a late combustion phase of one cylinder for the purpose of increasing exhaust temperature. Moreover, earlier opening of the exhaust valve of one cylinder and delaying the start of injection of the main injection to a later point in time during the power stroke of one cylinder serve to increase the exhaust temperature. These measures can be carried out either in one or several cylinders of reciprocating engine 20, while there is no change in the operation of the remaining cylinders. By these measures, the exhaust temperature can be set very precisely for a short time to minimize impairment of total engine performance.

A regeneration phase of oxidation catalytic converter 25 can take place either during desorption operation or during adsorption operation of adsorber catalytic converter 28. In the first case, the aforesaid engine control measures can be implemented for one or more cylinders, possibly in combination.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a multicylinder internal combustion engine having at least one adsorber catalytic converter in an exhaust line, comprising:

operating the adsorber catalytic converter with periodically alternating adsorption and desorption phases;

selectively recycling exhaust leaving the adsorber catalytic converter after desorption to an intake side of one set of cylinders of the engine; and operating the one set of cylinders during desorption independently of the other cylinders in a state of incomplete combustion.

2. The method according to claim 1, further comprising feeding only exhaust from the one set of cylinders operated in the state of incomplete combustion to adsorber catalytic converter during desorption.

3. The method according to claim 2, further comprising:

operating a second adsorber catalytic converter that receives at least exhaust from a second set of cylinders that do not receive the recycled exhaust, wherein said operating the second adsorber catalytic converter is during desorption of the at least one adsorber catalytic converter and said second adsorber catalytic converter is parallel to the at least one adsorber catalytic converter.

4. The method for operating a multicylinder internal combustion engine according to claim 1, further comprising:

afterburning in an oxidation catalytic converter located upstream of the at least one adsorber catalytic converter during the desorption operation of the at least one adsorber catalytic converter; and regenerating the oxidation catalytic converter, thereby removing soot.

5. The method according to claim 4, wherein said regenerating lasts approximately 0.5 sec to 10 sec at an exhaust temperature of approximately 500° C. to approximately 800° C.

6. The method according to claim 4, further comprising:

during said regenerating of the oxidation catalytic converter, increasing an exhaust temperature by at least one of:

injecting an additional quantity of fuel in a delayed combustion phase;

earlier opening of the exhaust valve; and retarding the start of injection of the main injection in at least some of the cylinders of the internal combustion engine.

* * * * *